United States Patent
Shah et al.

(10) Patent No.: US 8,874,302 B2
(45) Date of Patent: Oct. 28, 2014

(54) AUTOMOTIVE SCANNER WITH ADVANCED MODULE PROGRAMMING OPTIONS

(75) Inventors: Hemang Shah, Owatonna, MN (US); Brant Story, Faribault, MN (US); Poojitha Dahanaike, Mankato, MN (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 2253 days.

(21) Appl. No.: 11/138,438

(22) Filed: May 27, 2005

(65) Prior Publication Data

US 2006/0271254 A1    Nov. 30, 2006

(51) Int. Cl.
*G01M 17/00* (2006.01)
*G01M 17/007* (2006.01)
*G06F 9/445* (2006.01)
*G07C 5/00* (2006.01)

(52) U.S. Cl.
CPC ............... *G01M 17/007* (2013.01); *G06F 8/65* (2013.01); *G07C 5/008* (2013.01)
USPC ....... 701/29.1; 701/33.1; 701/31.7; 701/31.4; 702/85; 702/104; 702/107; 702/108

(58) Field of Classification Search
USPC .................................................. 701/2, 29, 33
See application file for complete search history.

(56) References Cited

U.S. PATENT DOCUMENTS

| | | | |
|---|---|---|---|
| 5,787,367 A * | 7/1998 | Berra ................................ | 701/1 |
| 6,571,191 B1 * | 5/2003 | York et al. .................... | 702/107 |
| 6,782,313 B1 | 8/2004 | Frech et al. | |
| 2004/0002793 A1 * | 1/2004 | Tachibana et al. ................ | 701/1 |

* cited by examiner

*Primary Examiner* — Redhwan k Mawari
(74) *Attorney, Agent, or Firm* — Baker & Hostetler LLP (57) ABSTRACT

Exemplary embodiments of an improved scanning tool with a module reprogramming capability are disclosed. In various embodiments, the improved scanning tool uses sophisticated identification software to identify automotive functional modules to identify the modules' part-numbers and resident software revisions. The appropriate update software can then be uploaded and programmed onto the modules of interest with minimal delay and human interaction.

20 Claims, 6 Drawing Sheets

AUTOMOTIVE SCANNER WITH ADVANCED MODULE PROGRAMMING OPTIONS

FIELD OF THE INVENTION

The present invention relates generally to the field of electronic testing devices, and more specifically to "off-board tools," such as scanning tools for vehicle diagnostics, maintenance and upgrades.

BACKGROUND OF THE INVENTION

Automobiles have evolved from machines having minimalist electrical systems where an AM radio represented the most sophisticated on-board electronic device to technologically sophisticated machines using a variety of electronic sensors, microprocessors and custom-designed integrated circuitry. Today, most automotive electronic systems resemble a collection of independent, processor-controlled modules interconnected by a common local area network bus. Such modules can range in functionality from engine control to brake control seat adjustment to specialized emergency communication systems.

Unfortunately, as automobiles have evolved, so have the burdens of maintenance, repairs and upgrades. Modern automotive repairmen now need to be proficient electronic technicians as well as able mechanics.

One tool often used by automotive technicians/repairmen for automotive maintenance and repair is known as a "scanning tool", "scantool" or "scanner". While scanners range greatly in sophistication and utility, they all generally work in generally the same way, i.e., by communicating with various automotive modules over a common network bus in order to perform queries of modules, order the modules to perform certain operations (e.g., self-tests), check certain functionality of the modules and so on.

A more recent task demanded of scanners by the automotive industry is the requirement to reprogram modules, a process sometimes referred to as "reflashing". The process of reflashing generally requires that a module manipulate an on-board "flash" memory by first erasing one or more blocks of the flash memory, then rewriting new information into the erased blocks. The new information, which can include various operational parameters and executable computer code, is usually designed to change the operation of the module, and reprogramming a module with upgrade software/firmware is generally done to increase performance of the module, force the module to comply with new regulations, change ergonomic interfaces and so on.

Unfortunately, the existing systems necessary to reprogram modules using scanning tools can be excessively cumbersome, sometimes requiring a technician to spend over an hour of background research before the actual process of reprogramming can begin. Accordingly, new technology directed to reprogramming automotive modules is desirable.

SUMMARY OF THE INVENTION

In a first sense, an enhanced scanning apparatus for communicating with automotive electronic systems includes a first communication interface adapted to communicate with one or more automotive functional modules over a control/data bus, a module identification device configured to interact with the one or more automotive functional modules via the first communication interface, the module identification device being configured to identify the part-number of a first module of interest, and a programming device configured to program the first module with update software designed to change the operation of the first module, the update software being selected for programming based on the identified part number.

In a second sense, a method for reprogramming an automotive functional module residing in an automobile includes performing a module identification process on a first module over a control/data bus in the automobile to identify a part-number of the module, wherein the identification process includes extracting data from the module and analyzing the extracted data for features associated with the part number, and reprogramming the first module with update software designed to change the operation of the module, the update software being selected based on the identified part number.

In a third sense, an enhanced scanning apparatus for communicating with automotive electronic systems includes a first communication interface adapted to communicate with one or more automotive functional modules over a control/data bus, an identification means for identifying an automotive functional module to provide a part-number for a first module, and a programming device configured to program the first module with update software designed to change the operation of the first module, the update software being selected for programming based on the identified part number.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to example principles of this invention, wherein.

DETAILED DESCRIPTION OF THE INVENTION

Figure 1:
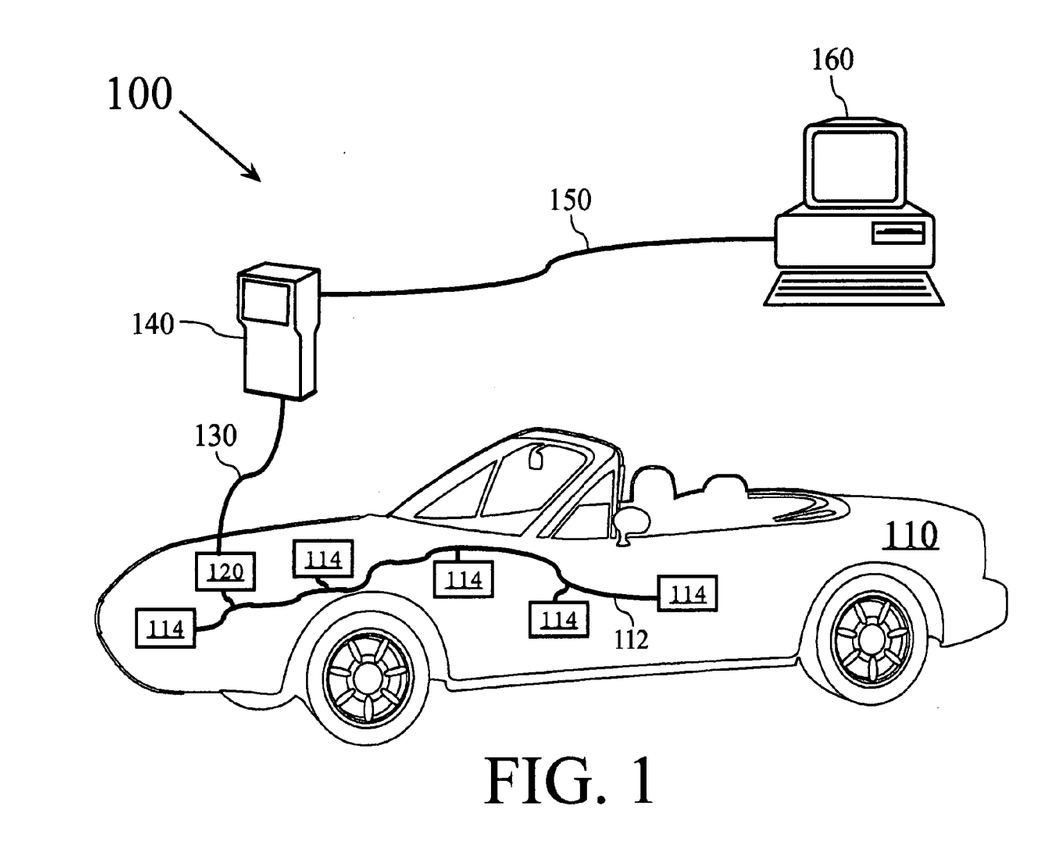
FIG. 1 depicts an diagnostic setup for an automobile using a scanning tool and personal computer.

FIG. 1 depicts a system 100 useful for reprogramming modules, such as an automobile manufactured by General Motors. As shown in FIG. 1, the system 100 includes an automobile 110 coupled to a scanning tool 140 via link 130. The scanning tool 140 is also coupled to an external computer 160 via link 150. The automobile 110 includes a number of electronic control modules 114 coupled together via a common control/data bus 112. External access to the control/data bus 112 by the scanning tool 140 is accommodated by link 130 and connector interface 120.

In a conventional operation mandated by the limitations of software tools made available by automobile manufacturers, a technician must start a conventional reprogramming process by identifying the part-number of the module by using the external computer 160. More particularly, the technician must use a combination of menus and technical manuals to identify module part numbers, a process than can take over an hour in some cases given that module part numbers can vary from maker to maker, model to model, year to year, month to month or according to custom requirements.

Once the appropriate part-number is identified, the external computer 160 can access the appropriate upgrade software. For the purpose of this disclosure, the term "software" (or "firmware"), as used herein includes, but is not limited to, one or more computer readable and/or executable instructions that cause a computer or other electronic device to perform functions, actions, and/or behave in a desired manner. The instructions may be embodied in various forms such as routines, algorithms, executable modules or programs including separate applications or code from dynamically linked libraries. Software may also be implemented in various forms such as a stand-alone program, a function call, a servlet, an applet, instructions stored in a memory, part of an operating system or other type of executable instructions. Still further, the term "software" can refer to one or more operational parameters upon which a computer or other electronic device can act upon. It will be appreciated by one of ordinary skill in the art that the form of software/firmware is dependent on, for example, requirements of a desired application, the environment it runs on, and/or the desires of a designer/programmer or the like.

Returning to FIG. 1, the scanning tool 140 can receive the upgrade software provided by the external computer 160, then embark on the process of reprogramming the appropriate module using commands issued over link 130, connector 120 and bus 112.

In the improved operation designed by the inventors of the disclosed methods and systems, module identification is not performed either by a technician or by the external computer 160. To the contrary, the inventors have designed an approach whereby the scanning tool 140 can determine a module part-number with little or no intervention by a technician or other operator.

For example, compliant with existing available software made available by General Motors, a technician can minimize use of the external computer 160 by performing only those operations that will bring up a screen containing a part-number entry window (not shown).

Next, the technician can enter module type into the scanning device 140 directly (e.g., a keypad), via the external computer 160 or via some other device. Once the scanning tool 140 has the module type of interest, the scanning tool 140 can then communicate with the appropriate module 114 residing on bus 112 to perform a module identification process. The module identification process in the present embodiment can identify the module's part number, but in other embodiments can identify the software (with revision number) residing on the module. Once identified, the scanning tool 140 can display the identified part-number (and software revision) to the technician.

In turn, the technician can read the identified part number, then transcribe the identified part-number into the external computer entry window discussed above. The external computer 160 can then provide the appropriate update software to the scanning tool 140. The scanning tool 140, in turn, can receive the upgrade software provided by the external computer 160, then embark on the process of reprogramming the appropriate module using commands issued over link 130, connector 120 and bus 112. Once reprogramming is complete, the scanning tool can verify successful reprogramming.

In a second embodiment, instead of providing the identified part-number to a display for later transcription by a technician, the scanning tool 140 can deliver the part-number directly/electronically to the external computer via link 150. The external computer 160 can then reply with the appropriate update software, which can then be programmed into the module of interest.

If the scanning tool 140 is equipped to identify existing software/software revisions residing on the module of interest, the scanning tool 140 can provide such information to the external computer 160, wherein the external computer 160 can make an assessment as to whether the module of interest requires an update. For example, if a braking module already has the most up-to-date software available for its part number, then the external computer 160 can make such an assessment based on information provided by the scanning tool 140 before alerting the technician as to the necessity to reprogram or lack thereof.

In still other embodiments, the scanning tool can subsume some or all of the functions of the external computer 160. For example, given the growing capacity of memories, the scanning device 140 can possibly hold or access memory modules (e.g., disks, PCMCIA cards, USB memory sticks etc.) having every software revision for a given module type or every software revision for every module type for a given make and/or model automobile.

Figure 2:
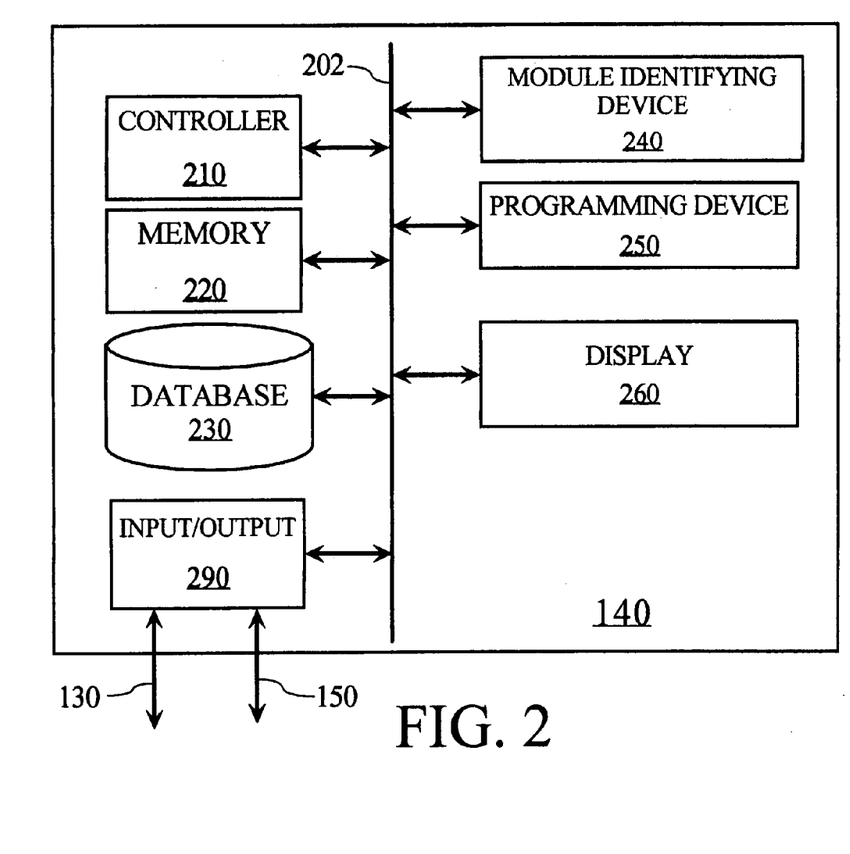
FIG. 2 shows details of an embodiment of the scanning tool of FIG. 1.

FIG. 2 depicts a block diagram of relevant portions of the scanning tool 140 of FIG. 1 according to various embodiments. As shown in FIG. 2, the exemplary scanning tool 140 includes a controller 210, a memory 220, a database 230, a module identification device 240, a programming device 250, a display 260 and an input/output device 290. The above components 210-290 are coupled together by control/data bus 202.

Although the exemplary scanning tool 140 of FIG. 2 uses a bussed architecture, it should be appreciated that any other architecture may be used as is well known to those of ordinary skill in the art. For example, in various embodiments, the various components 210-290 can take the form of separate electronic components coupled together via a series of separate busses.

Still further, in other embodiments, one or more of the various components 210-290 can take form of separate servers coupled together via one or more networks. Additionally, it should be appreciated that each of components 210-290 advantageously can be realized using multiple computing devices employed in either of a cooperative or redundant fashion. For example, by employing two or more separate data collection and translation devices, e.g., servers, to collect information from various information sources for each data formatting and distribution device, a processing bottleneck may be reduced/eliminated and the overall system performance increased. Further, by providing redundant database storage utilities 240, overall system reliability might be increased.

It also should be appreciated that some of the above-listed components can take the form of software/firmware routines residing in memory 220 and be capable of being executed by the controller 210, or even software/firmware routines residing in separate memories in separate servers/computers being executed by different controllers. Further, it should be understood that the functions of any or all of components 230-280 can be constructed using object-oriented software, thus increasing portability, software stability and a host of other advantages not available with non-object-oriented software.

In operation, the scanning tool 140 can first receive information about the type module that is to be reprogrammed. As discussed above, the particular method of making this information available can vary from embodiment to embodiment. Once this information is made available, the module identification device 240 can search for an existing module of the appropriate type via input/output device 290 and link 130. Once the module of interest is found, the module identification device 240 can perform a host of module identification processes on the module using information in database 230.

Generally, it can be expected that the forms of identification process can change from module type to module type, within module types and even within modules of the same part-number but having different operational software. In some situations, identifying a part-number may be as simple as sending a single "identify" command and interpreting the response. In other situations, identification may take a more complex form of analysis, such as looking for particular pieces of executable code at certain addresses, looking for particular sensor information at certain addresses, analyzing a series of responses for format and content and so on.

Figure 3:
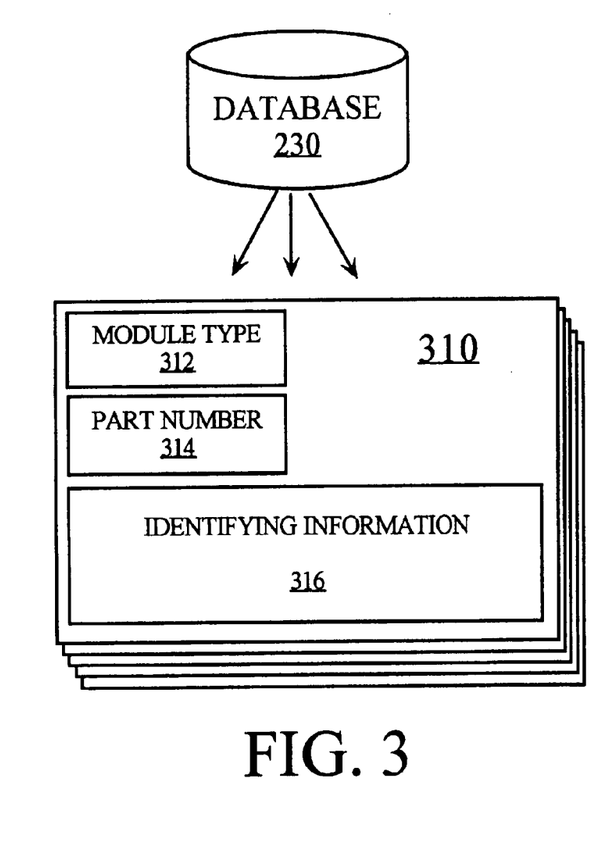
FIG. 3 depicts an exemplary module identification entry for a module identification database.

FIG. 3 depicts an exemplary identification record 310 of database 230. As shown in FIG. 3, the identification record 310 contains a module type field 312, a part-number field 314 and an identification information field 316, which can contain descriptions, templates of module architecture, software instructions and/or any other form of data useful to identify modules. While the present embodiment uses a database structure to organize identification information, it should be appreciated that such identification information can be embedded in any form of data structure, including structures of computer executable code. For example, rather than contain any form of raw data, the identification information field 316 could include (or take the form of) an executable program module that, under control of controller 210, could provide a yes/no answer as to whether the module of interest conforms with the module type and part-number respectively listed in the module type field 312 and part-number field 314.

Returning to FIG. 2, once the module identification processes are complete and the module part-number identified (again with software revision identification optional), the identified module part-number can be provided to an external computer as discussed above via the display 260, via the input/output device 290 or by some other means. Assuming that the appropriate update software is uploaded into the scanning tool 140 via an external device, or found locally in memory 220 or some other memory, the programming device 250 can then program the module of interest using the appropriate protocol required by the module. Verification of successful software update can optionally be performed, and a signal to the technician/external computer indicating successful reprogramming can be sent.

Figure 4:
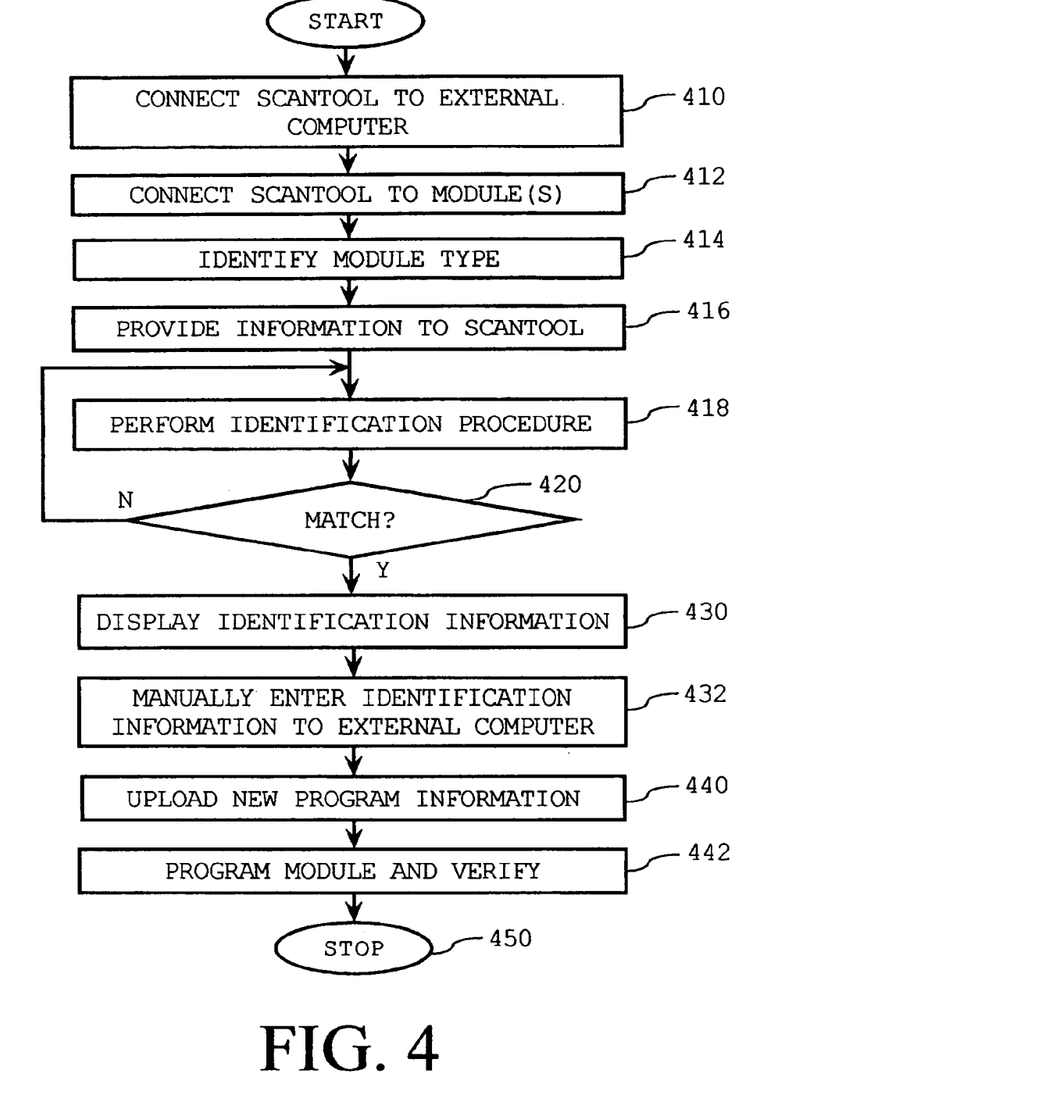
FIG. 4 is a flowchart outlining a first exemplary operation according to the present disclosure.

FIG. 4 is a flowchart outlining a first exemplary operation according to the present disclosure for reprogramming a functional automotive module. The process starts in step 410 where a scanning tool can be connected to an external computer or similar device. Next, in step 412, the scanning tool can be connected to one or more modules residing on a common bus in an automobile. Then, in step 414, the module type, e.g., window and door controller, is identified, and in step 416 this information is provided to the scanning tool. Control continues to step 418.

In step 418, a first identification procedure is performed to determine whether a module of interest (of the appropriate module type) appears to match a given part number. If there is not a match, control jumps back to step 418 where a second identification procedure is performed and so on until a match is found; otherwise when a match is found control continues to step 430.

In step 430, which assumes the identification process embodied in steps 418-420 has identified a valid part-number (and optionally software revision information) for the module of interest, the identified part-number/software revision can be displayed to a technician or other operator. Next, in step 432, the technician/operator can manual enter any identification information provided by the scanning tool. Then, in step 440, the appropriate update software can be provided to the scanning tool from the external computer. Control continues to step 442.

In step 442, the module of interest can be programmed with the update software and a verification process can be performed. Control then continues to step 450 where the process stops.

Figure 5:
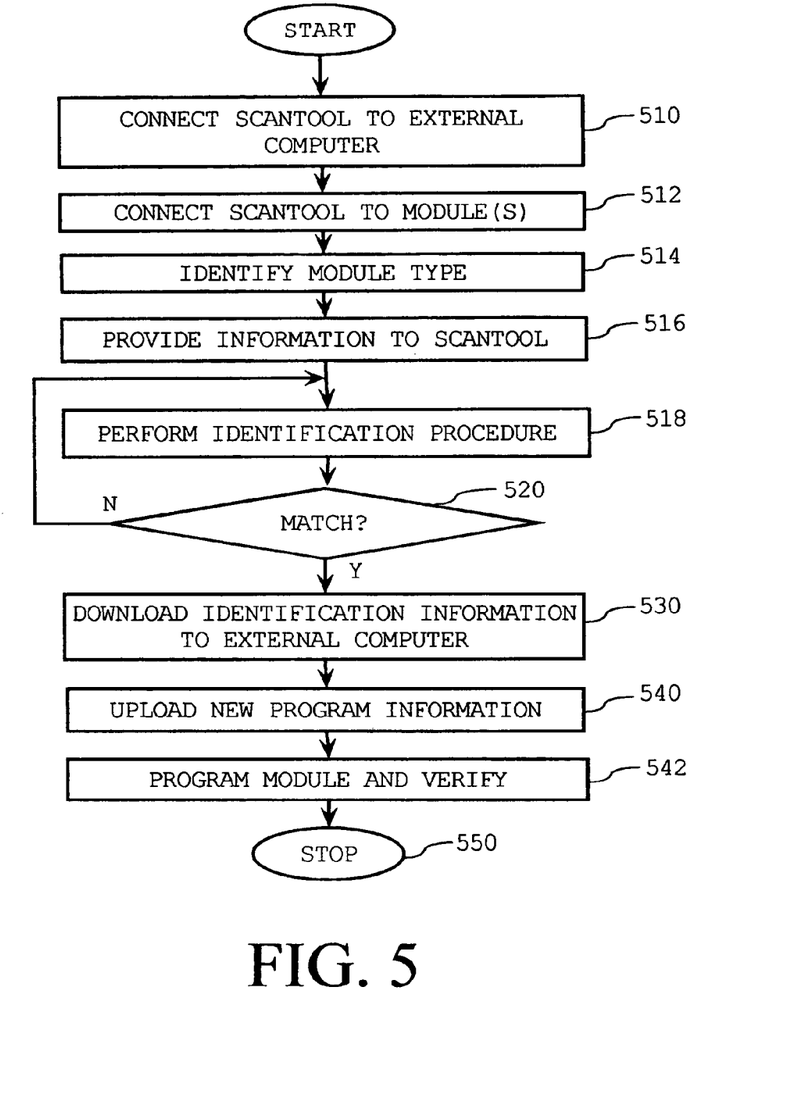
FIG. 5 is a flowchart outlining a second exemplary operation according to the present disclosure.

FIG. 5 is a flowchart outlining a second exemplary operation according to the present disclosure for reprogramming a functional automotive module. The process starts in step 510 where a scanning tool can be connected to an external computer or similar device. Next, in step 512, the scanning tool can be connected to one or more modules residing on a common bus in an automobile. Then, in step 414, the module type, e.g., window and door control, is identified, and in step 516 this information is provided to the scanning tool. Control continues to step 518.

In step 518, a first identification procedure is performed to determine whether a module of interest (of the appropriate module type) appears to match a given part number. If there is not a match, control jumps back to step 518 where a second identification procedure is performed and so on until a match is found; otherwise when a match is found control continues to step 530.

In step 530, which assumes the identification process embodied in steps 518-520 has identified a valid part-number (and optionally software revision information) for the module of interest, instead of providing information to an external computer via a display and operator, the identification information can be directly uploaded electronically to an external computer. Subsequently, in step 540, the appropriate update software can be provided to the scanning tool, and in step 542 the module of interest can be programmed with the update software with verification.

Figure 6:
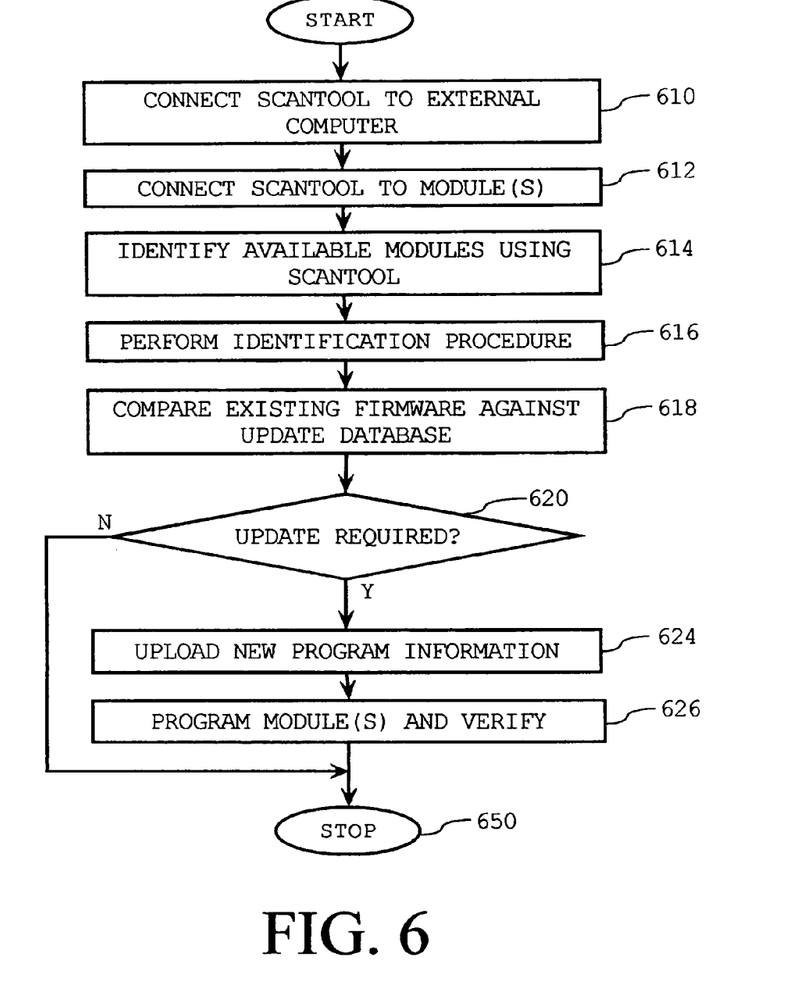
FIG. 6 is a flowchart outlining a third exemplary operation according to the present disclosure.

FIG. 6 is a flowchart outlining a third exemplary operation according to the present disclosure for reprogramming a functional automotive module. The process starts in step 610 where a scanning tool can be connected to an external computer or similar device. Next, in step 612, the scanning tool can be connected to one or more modules residing on a common bus in an automobile. Then, in step 614, one or more of the various modules are identified by type, either manually by a technician or automatically by intelligently designed software within the scanning tool. Control continues to step 616.

In step 616, the identified modules are processed using the various techniques discussed above to determine respective part numbers and software revisions. Next, in step 618, the software presently residing on the modules of interest are compared against a database of current/desired software. Control continues to step 620.

In step 620, a determination is made as to whether any of the modules of interest require a software update. If one or more software updates are required, control continues to step 624; otherwise, control continues to step 650 where the process stops.

In step 624, the appropriate update software can be provided to the scanning tool. Next, in step 626, the module(s) of interest can be programmed with the update software and a verification process can be performed. Control then continues to step 650 where the process stops.

In various embodiments where the above-described systems and/or methods are implemented using a programmable device, such as a computer-based system or programmable logic, it should be appreciated that the above-described systems and methods can be implemented using any of various known or later developed programming languages, such as "C", "C++", "FORTRAN", Pascal", "VHDL" and the like.

Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer (such as a computer in a scanning tool), the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to automotive repair and maintenance services.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An enhanced scanning apparatus for communicating with automotive electronic systems and being adapted to improve ease of use and decrease a time required by an operator to program an automotive functional module, the scanning apparatus comprising:
   a first communication interface adapted to communicate with one or more automotive functional modules over a control/data bus;
   a module identification device configured to interact with the one or more automotive functional modules via the first communication interface, the module identification device being configured to search for a first functional module of interest within the automotive electronic system matching a functional module type, and further configured to query and identify a part number of the first module of interest; and
   a programming device configured to program the first functional module of interest with update software designed to change an operation of the first functional module of interest and verify a success of the programming, the update software being selected for programming based on the identified part number.

2. The apparatus of claim 1, further comprising a memory containing a plurality of identification codes used by the module identification device to identify one or more automotive functional modules, the plurality identification codes containing information relating part numbers to respective module traits.

3. The apparatus of claim 2, wherein at least some identification codes take a form of a template database of records with each record containing information associating a particular module with a respective set of identifying traits.

4. The apparatus of claim 1, further comprising a second interface for communicating with an external computer, wherein the scanning apparatus is configured to receive the update software from the external computer via the second interface based on the identified part number.

5. The apparatus of claim 4, wherein the scanning apparatus is configured to display the identified part number to the operator via a first display, and the scanning apparatus receives the update software from the external computer as a result of the operator providing the identified part number to the external computer.

6. The apparatus of claim 4, wherein the scanning apparatus is configured to provide the identified part number to the external computer via the second interface, and the scanning apparatus receives the update software from the external computer as a result of the operator providing the identified part number to the external computer.

7. The apparatus of claim 1, wherein the module identification device and programming device are configured to interact with General Motors vehicles.

8. The apparatus of claim 4, wherein the scanning apparatus is configured to receive an indication of functional module type, and wherein the module identification device identifies the part number of the functional module of the received indication type.

9. The apparatus of claim 1, wherein the module identification device identifies both the part number and a software revision residing in the first functional module of interest.

10. The apparatus of claim 9, wherein either the scanning apparatus or an external computer determines whether a resident software is a current version.

11. A method for reprogramming an automotive functional module residing in an automobile, comprising:
   performing a module identification process on a first module over a control/data bus in the automobile to identify a part number part number of the module, wherein the module identification process includes receiving a functional module type, searching for the first module matching the functional module type, querying and extracting data from the first module and analyzing the extracted data for features associated with the part number;

reprogramming the first module with update software designed to change an operation of the first module, the update software being selected based on the identified part number; and verifying a success of the reprogramming of the first module with the update software.

12. The method of claim 11, wherein performing the module identification process includes the step of comparing response information derived from the first module with a plurality of records relating part numbers to respective module traits.

13. The method of claim 12, wherein performing the module identification process includes comparing, with a computer, at least one of response codes, embedded parameters and embedded instruction code of the first module with a plurality of records, each record containing information relating to response codes, embedded parameters and embedded instruction code.

14. The method of claim 13, further comprising receiving the update software from an external computer via an interface, wherein the update software is provided based on the identified part number.

15. The method of claim 14, further comprising displaying the identified part number to an operator via a first display, and wherein receiving the update software is contingent on the operator entering the identified part number to the external computer.

16. The method of claim 14, further comprising providing the identified part number to the external computer via the interface, and receiving the update software from the external computer as a result of the operator providing the identified part number to the external computer.

17. The method of claim 11, wherein the first module is a portion of a General Motors vehicle.

18. The method of claim 11, further comprising identifying, a software revision of software residing in the first module.

19. An enhanced scanning apparatus for communicating with automotive electronic systems, comprising:

a first communication interface adapted to communicate with one or more automotive functional modules over a control/data bus;

an identification means for receiving an automotive functional module type, searching for the automotive functional module matching the automotive functional module type, and identifying and querying the automotive functional module to provide a part-number for a first module; and a programming device configured to program the first module with update software designed to change an operation of the first module and verify success of the programming, the update software being selected for programming based on the identified part number.

20. The apparatus of claim 19, wherein the module identification means identifies both the part-number and a software revision residing in the first functional module of interest.

* * * * *